Oct. 12, 1926.
M. C. HORINE
1,602,978
COMBINATION BUS LIGHT AND VENTILATOR
Filed August 26, 1924
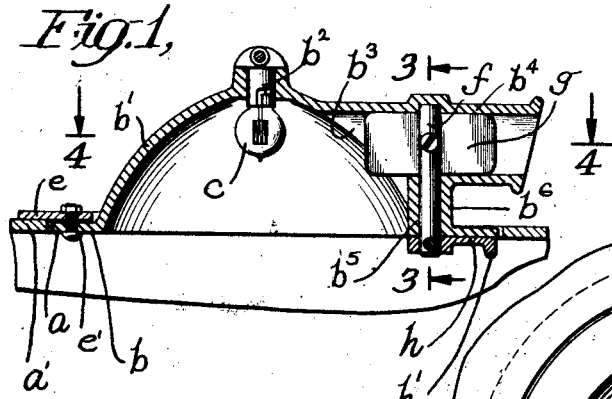
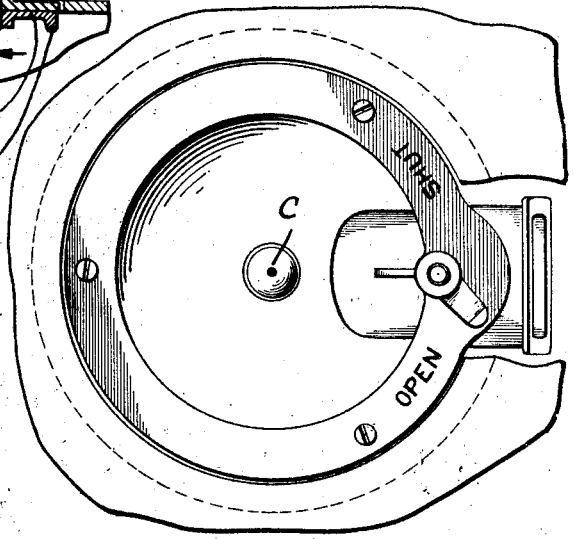
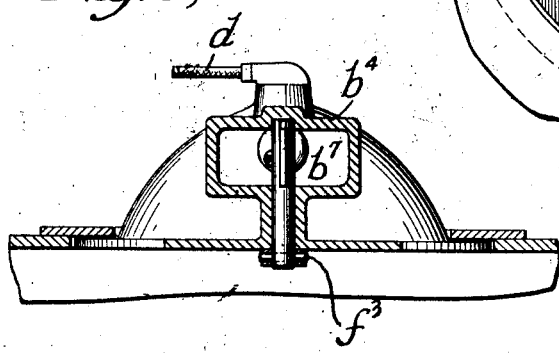
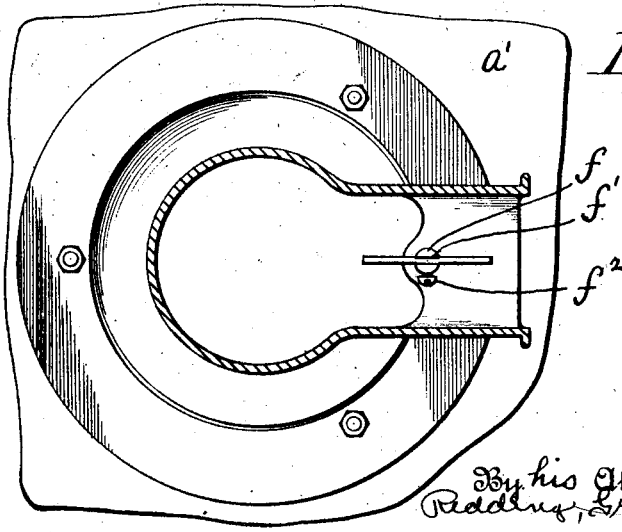
Inventor
Merrill C Horine.
By his Attorneys
Redding, Greeley, O'Shea and Campbell Patented Oct. 12, 1926.

1,602,978

UNITED STATES PATENT OFFICE.

MERRILL C. HORINE, OF RICHMOND, NEW YORK, ASSIGNOR TO INTERNATIONAL MOTOR COMPANY, OF NEW YORK, N. Y., A CORPORATION OF DELAWARE.

COMBINATION BUS LIGHT AND VENTILATOR.

Application filed August 26, 1924. Serial No. 734,176.

At the present time vehicle bodies particularly bus bodies are provided with very low roofs. On the ceilings of the vehicles are generally secured dome lights and exhaust ventilators. The dome lights at present in use necessarily restrict head room and wherever they are placed in the ceiling are apt to strike the heads of passengers while seated or while getting in or out of the vehicle. Furthermore, the dome lights are apt to cause a certain amount of glare in the eyes of the passengers. Exhaust type roof ventilators in passenger carrying vehicles, being generally of considerable size, are as a rule insufficient in number. It is an object of the present invention to provide a dome light which shall approximate ideal conditions so far as lighting effects are concerned while at the same time affording ample head room for the occupants of the vehicle. It is also an object of the invention to provide exhaust type ventilators so disposed as to give a more even and perfect ventilation. A further object of the invention is to provide a structure which shall meet the requirements hereinbefore described and shall be practical from manufacturing and commercial considerations. Accordingly the present invention proposes a combination of dome light and roof ventilator whereby the space above the roof occupied by the ventilator aperture is employed as a recess and reflector in which is disposed the source of light. More particularly the combined dome light and roof ventilator comprises an aluminium casting having a wide flange at its bottom adapted to lie flush with the edges of an aperture in the roof from which a dome rises, the inside of which is polished to serve as an efficient reflector for the light and out of which extends rearwardly an exhaust duct forming a passage from the interior of the dome to the outer air. Within the duct there is disposed a valve whereof the valve stem projects into the interior of the bus beneath the ceiling whereby the opening in the passage may be controlled to effect the desired ventilation within the vehicle. With such a construction the devices need be but little larger than the ordinary dome lights now in use and may be disposed above each seat of the bus thereby affording an ideal condition of illumination and ventilation. In order that the invention may be clearly understood the same will now be described more fully with reference to the accompanying drawings illustrating a preferred embodiment thereof and in which:

Figure 1 is a vertical sectional view showing a combined bus light and exhaust ventilator according to the present invention as applied to the roof of a vehicle.

Figure 2 is a view showing the ventilator in place in the ceiling of a vehicle looking from below and illustrating means for controlling the exhaust passage.

Figure 3 is a transverse view partly in section and partly in elevation taken in the plane indicated by the line 3—3 in Figure 1 and looking in the direction of the arrows and showing the exhaust passage fully open.

Figure 4 is a view taken in the plane indicated by the line 4—4 in Figure 1 and looking in the direction of the arrows and showing a preferred means for securing the combined dome light and ventilator to the roof of a bus.

According to the present invention an aperture $a$ may be formed at any convenient point in the roof $a'$ of the vehicle, the aperture being just sufficient to receive the flange $b$ of the combined dome light and ventilator. Preferably the flange will be circular from manufacturing considerations since the reflector will obviously be substantially spherical but any configuration of flange to fit the desired hole in the roof may be used. Flange $b$ is formed on the edge of the spherical reflecting portion $b'$ of the dome light and is preferably integral therewith although a separate flange may be secured in any convenient manner to the lower edge if desired. At the apex of the dome is formed a socket $b^2$ for the reception of the usual electric light $c$, the cable $d$ feeding the light being conducted thereto in any desired manner and from the disposition of the device will be exposed thereby affording easy access. The interior of the dome is, of course, polished or white enameled or otherwise finished to provide a highly reflecting surface. The means for securing the flange $b$ to the roof $a'$ takes the form, in the illustrated embodiment, of a ring or annulus $e$ which can be secured as by screws or the like to the roof adjacent the opening and may support the dome light as by bolts $e'$. By such construction the dome light is disposed entirely above the ceiling of the vehicle and no portion thereof projects below the ceiling to interfere with the head room of the vehicle. Other methods of securing the dome to the roof will appear to those skilled in the art, for instance, a lip on the dome may be extended below the flange, the flange bearing on the outside of the hole in the roof and a compression flange being disposed therebelow to clamp the edges of the roof about the hole therebetween.

At one side of the dome is formed an aperture $b^3$ opening into a passage $b^4$ which in the illustrated embodiment is rectangular. Passing through a circular bore $b^5$ formed in a boss $b^6$ immediately beneath the duct $b^4$ is a shaft or stem $f$ journaled at its upper end in the wall of the duct and extending slightly below the flange $b$. The upper end of the stem $f$ is preferably slotted as at $f'$ and within the slot is disposed a butterfly valve $g$ rectangular in outline and adapted to control the passage $b^7$ formed by the duct $b^4$. The butterfly valve $g$ may be conveniently secured in operative relation in the slot $f'$ by means of a set screw $f^2$. On the lower extremity of stem $f$ and secured thereto as by pin $f^3$ is an arm $h$ serving as a handle for actuation of the butterfly valve and as an indicator of the position thereof in the passage. The end of the arm $h$ may be formed with a downwardly projecting ear $h'$ for convenient grasp. By suitably positioning the arm on the stem at an angle to the plane of the butterfly valve, the position of the arm will readily show the condition of the ventilator. For instance, upon throwing the arm to the one side marked "Open" in Figure 2, the butterfly valve may be disposed in its extreme open position. By throwing the arm to the extreme opposite position, the valve may also be closed completely. By positioning the handle at intermediate points therebetween a partial closing of the passage may be effected. The lower surfaces of the flange may conveniently have inscribed thereon indications of the condition of the ventilator such as the words "Open" and "Shut". Various means may be adapted for maintaining the valve in intermediate positions of adjustment, such as serrations on the proximate faces of the arm and flange.

It will thus be seen that a particularly efficacious lighting and ventilating device has been provided for motor vehicles which is disposed entirely above the ceiling of the vehicle and while affording ample illumination obviates an unpleasant glare to the eyes of the passengers and permits equal distribution of the ventilating as well as illuminating media in structures which are simple, easy and cheap to manufacture. Furthermore, the installation of the device is considerably simplified since the combination requires the use of few units while advantages of the elimination of the usual grating or disc valve in the usual type of ventilator by the substitution of a simple quadrant lever will be obvious, and simpler and more accessible wiring is permitted due to the outside connections.

Various modifications may be made in the means for securing the dome in the roof of the vehicle as well as in the configuration of the valve and its control, and no limitation is intended except as indicated in the appended claims.

What I claim is:

1. A combined dome light and ventilator for vehicles comprising a reflector, means to carry the reflector wholly above the surface of the ceiling of the vehicle, a source of light carried by the reflector above its lower edge, and a passage in the reflector leading to the atmosphere above the roof.

2. A combined dome light and ventilator for vehicles comprising a reflector, means to carry the reflector with its lower edge flush with the ceiling of the vehicle, a source of light carried by the reflector and above its lower edge, a passage in the dome leading to the atmosphere, said passage and light being above the roof, and means to control the passage.

3. The combination with the roof of a vehicle of a reflector formed with a flange about its periphery, means to secure said flange to the roof, a source of light carried by the reflector and above its lower edge, an aperture in the reflector, said aperture and light being above the roof, and means mounted in the reflector to control the passage.

This specification signed this 13th day of August, A. D. 1924.

MERRILL C. HORINE.